(12) United States Patent
Heremagalur Ramaprasad et al.

(10) Patent No.: US 11,567,874 B2
(45) Date of Patent: Jan. 31, 2023

(54) PREFETCH MANAGEMENT IN A HIERARCHICAL CACHE SYSTEM

(71) Applicant: TEXAS INSTRUMENTS INCORPORATED, Dallas, TX (US)

(72) Inventors: Bipin Prasad Heremagalur Ramaprasad, Austin, TX (US); David Matthew Thompson, Dallas, TX (US); Abhijeet Ashok Chachad, Plano, TX (US); Hung Ong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/520,805

(22) Filed: Nov. 8, 2021

(65) Prior Publication Data
US 2022/0058127 A1 Feb. 24, 2022

Related U.S. Application Data

(63) Continuation of application No. 16/856,169, filed on Apr. 23, 2020, now Pat. No. 11,169,924, which is a continuation of application No. 16/102,862, filed on Aug. 14, 2018, now Pat. No. 10,642,742.

(51) Int. Cl.
G06F 12/08 (2016.01)
G06F 12/0862 (2016.01)
G06F 9/38 (2018.01)
G06F 12/0811 (2016.01)

(52) U.S. Cl.
CPC ........ G06F 12/0862 (2013.01); G06F 9/3802 (2013.01); G06F 12/0811 (2013.01); G06F 2212/602 (2013.01)

(58) Field of Classification Search
None
See application file for complete search history.

(56) References Cited

U.S. PATENT DOCUMENTS

| 5,361,391 | A | 11/1994 | Westberg |
| 5,784,590 | A | 7/1998 | Cohen et al. |
| 6,078,996 | A | 6/2000 | Hegersten |
| 2002/0194461 | A1 | 12/2002 | Henry et al. |
| 2012/0072668 | A1* | 3/2012 | Chirca ................ G06F 12/0862 711/E12.024 |
| 2015/0193236 | A1* | 7/2015 | Lin ....................... G06F 9/3806 712/207 |
| 2016/0179700 | A1* | 6/2016 | Venkatasubramanian ................... G06F 12/1045 711/205 |
| 2017/0293561 | A1* | 10/2017 | Dwiel ................. G06F 12/0886 |
| 2019/0114263 | A1* | 4/2019 | Olorode .............. G06F 12/0875 |

\* cited by examiner

Primary Examiner — Tracy C Chan
(74) Attorney, Agent, or Firm — Brian D. Graham; Frank D. Cimino

(57) ABSTRACT

An apparatus includes a CPU core, a first memory cache with a first line size, and a second memory cache having a second line size larger than the first line size. Each line of the second memory cache includes an upper half and a lower half. A memory controller subsystem is coupled to the CPU core and to the first and second memory caches. Upon a miss in the first memory cache for a first target address, the memory controller subsystem determines that the first target address resulting in the miss maps to the lower half of a line in the second memory cache, retrieves the entire line from the second memory cache, and returns the entire line from the second memory cache to the first memory cache.

20 Claims, 4 Drawing Sheets

US 11,567,874 B2

PREFETCH MANAGEMENT IN A HIERARCHICAL CACHE SYSTEM

CROSS REFERENCE TO RELATED APPLICATIONS

This application is a continuation of U.S. patent application Ser. No. 16/856,169, filed Apr. 23, 2020, which is a continuation of U.S. patent application Ser. No. 16/102,862, filed Aug. 14, 2018, now U.S. Pat. No. 10,642,742, each of which is incorporated by reference herein in its entirety.

This disclosure contains subject matter that may be related to the subject matter of U.S. patent application Ser. No. 16/102,931, filed Aug. 14, 2018, now U.S. Pat. No. 10,489,305, and U.S. patent application Ser. No. 16/694,751, filed Nov. 25, 2019.

BACKGROUND

Some memory systems include a multi-level cache system. Upon receipt from a processor core by a memory controller of a request for a particular memory address, the memory controller determines if data associated with the memory address is present in a first level cache (L1). If the data is present in the L1 cache, the data is returned from the L1 cache. If the data associated with the memory address is not present in the L1 cache, then the memory controller accesses a second level cache (L2) which may be larger and thus hold more data than the L1 cache. If the data is present in the L2 cache, the data is returned from the L2 cache to the processor core and a copy also is stored in the L1 cache in the event that the same data is again requested. Additional memory levels of the hierarchy are possible as well.

SUMMARY

In at least one example, an apparatus includes a central processing unit (CPU) core, a first memory cache to store instructions for execution by the CPU core, the first memory cache configured to have a first line size, and a second memory cache to store instructions for execution by the CPU core. The second memory cache has a second line size that is larger than the first line size, and each line of the second memory cache comprising an upper half and a lower half. A memory controller subsystem is coupled to the CPU core and to the first and second memory caches. Upon a miss in the first memory cache for a first target address, the memory controller subsystem determines that the first target address resulting in the miss maps to the lower half of a line in the second memory cache, retrieves the entire line from the second memory cache, and returns the entire line from the second memory cache to the first memory cache.

BRIEF DESCRIPTION OF THE DRAWINGS

For a detailed description of various examples, reference will now be made to the accompanying drawings in which.

DETAILED DESCRIPTION

Figure 1:
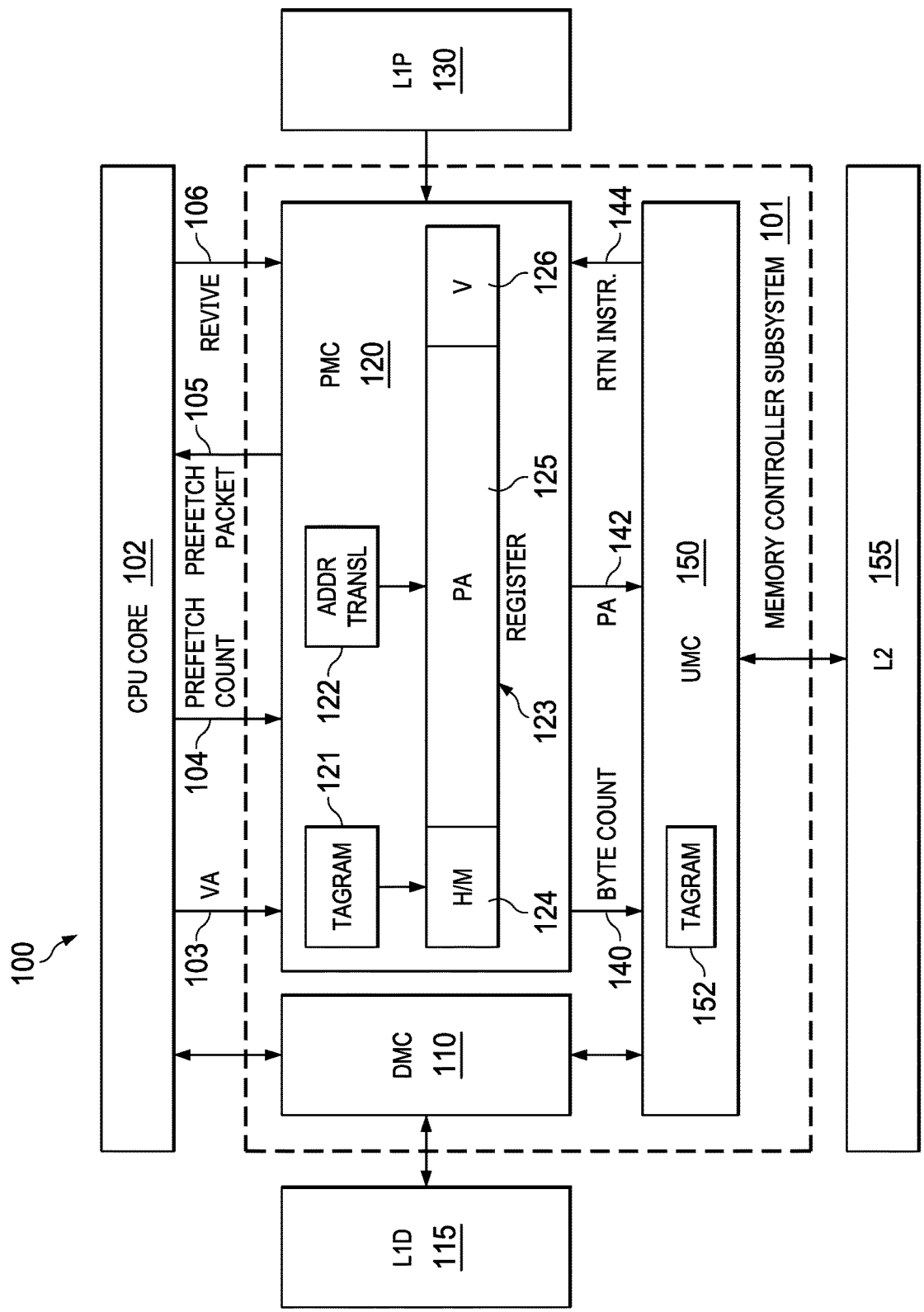
FIG. 1 illustrates a processor in accordance with an example.

FIG. 1 shows an example of a processor 100 that includes a hierarchical cache subsystem. The processor 100 in this example includes a central processing unit (CPU) core 102, a memory controller subsystem 101, an L1 data cache (L1D) 115, an L1 program cache (L1P) 130, and an L2 memory cache 155. In this example, the memory controller subsystem 101 includes a data memory controller (DMC) 110, a program memory controller (PMC) 120, and a unified memory controller (UMC) 150. In this example, at the L1 cache level, data and program instructions are divided into separate caches. Instructions to be executed by the CPU core 102 are stored in the L1P 130 to then be provided to the CPU core 102 for execution. Data, on the other hand, is stored in the L1D 115. The CPU core 102 can read data from, or write data to, the L1D 115 but has read access to (no write access to) the L1P 130. The L2 memory cache 155 can store both data and program instructions.

Although the sizes of the L1D 115, L1P 130, and L2 memory cache 155 can vary from implementation to implementation, in one example, the size of the L2 memory cache 155 is larger than the size of either the L1D 115 or the L1P 130. For example, the size of the L1D 115 is 32 kbytes and the size of the L1P also is 32 kbytes, while the size of the L2 memory cache can between 64 kbytes and 4 MB. Further, the cache line size of the L1D 115 is the same as the cache line size of the L2 memory cache 155 (e.g., 128 bytes), and the cache line size of the L1P 130 is smaller (e.g., 64 bytes).

Upon the need by the CPU core 102 for data, the DMC 110 receives an access request for the target data from the CPU core 102. The access request may comprise an address (e.g., a virtual address) from the CPU core 102. The DMC 110 determines whether the target data is present in the L1D 115. If the data is present in the L1D 115, the data is returned to the CPU core 102. If, however, the data requested by the CPU core 102 is not present in the L1D 115, the DMC 110 provides an access request to the UMC 150. The access request may comprise a physical address that is generated by the DMC 110 based on the virtual address (VA) provided by the CPU core 102. The UMC 150 determines whether the physical address provided by the DMC 110 is present in the L2 memory cache 155. If the data is present in the L2 memory cache 155, the data is returned to the CPU core 102 from the L2 memory cache 155 with a copy being stored in the L1D 115. An additional hierarchy of the cache subsystem may be present as well. For example, an L3 memory cache or system memory may be available to be accessed. As such, if the data requested by the CPU core 102 is not present in either the L1D 115 or the L2 memory cache 155, the data can be accessed in an additional cache level.

With regard to program instructions, when the CPU core 102 needs additional instructions to execute, the CPU core 102 provides a VA 103 to the PMC 120. The PMC responds to the VA 103 provided by the CPU core 102 by initiating a work flow to return a prefetch packet 105 of program instructions back to the CPU core 102 for execution. Although the size of the prefetch packet can vary from implementation to implementation, in one example, the size of the prefetch packet equals the size of the cache line of the L1P 130. If the L1P cache line size is, for example, 64 bytes, a prefetch packet returned to the CPU core 102 will also contain 64 bytes of program instructions.

The CPU core 102 also provides a prefetch count 104 to the PMC 120. In some implementations, the prefetch count 104 is provided to the PMC 120 after the CPU core 102 provides the VA 103. The prefetch count 104 indicates the number of prefetch units of program instructions following the prefetch unit starting at the VA 103. For example, the CPU core 102 may provide a VA of 200*h*. That VA is associated with a prefetch unit of 64 bytes that begins at virtual address 200*h*. If the CPU core 102 wants the memory controller subsystem 101 to send additional instructions for execution following the prefetch unit associated with virtual address 200*h*, the CPU core 102 submits a prefetch count with a value greater than 0. A prefetch count of 0 means that the CPU core 102 does not need any more prefetch units. A prefetch count of, for example, 6 means that the CPU core 102 requests an additional 6 prefetch units worth of instructions to be obtained and sent back to the CPU core 102 for execution. The return prefetch units are shown in FIG. 1 as prefetch packets 105.

Referring still to the example of FIG. 1, the PMC 120 includes a TAGRAM 121, an address translator 122, and a register 123. The TAGRAM 121 includes a list of the virtual addresses whose contents (program instructions) have been cached to the L1P 130. The address translator 122 translates virtual addresses to physical addresses (PAs). In one example, the address translator 122 generates the physical address directly from the virtual address. For example, the lower 12 bits of the VA may be used as the least significant 12 bits of the PA, with the most significant bits of the PA (above the lower 12 bits) being generated based on a set of tables configured in main memory prior to execution of the program. In this example, the L2 memory cache 155 is addressable using physical addresses, not virtual addresses. The register 123 stores a hit/miss indicator 124 from a TAGRAM 121 look-up, the physical address 125 generated by the address translator 122 and a valid bit 126 (also referred to herein as a status bit) to indicate whether the corresponding hit/miss indicator 124 and physical address 125 are valid or invalid.

Upon receipt of a VA 103 from the CPU 102, the PMC 120 performs a TAGRAM 121 look-up to determine whether the L1P 130 includes program instructions associated with that virtual address. The result of the TAGRAM look-up is a hit or miss indicator 124. A hit means that the VA is present in the L1P 130 and a miss means that the VA is not present in the L1P 130. For an L1P 130 hit, the target prefetch unit is retrieved by the PMC 120 from the L1P 130 and returned as a prefetch packet 105 to the CPU core 102.

For an L1P 130 miss, the PA (generated based on the VA) is provided by the PMC 120 to the UMC 150 as shown at 142. A byte count 140 also is provided from the PMC 120 to the UMC 150. The byte count indicates the number of bytes of the L2 memory cache 155 that is to be retrieved (if present) starting at the PA 142. In one example, the byte count 140 is a multi-bit signal that encodes the number of bytes desired from the L2 memory cache 155. In an example, the line size of the L2 memory cache is 128 bytes, and each line is divided into an upper half (64 bytes) and a lower half (64 bytes). The byte count 140 thus may encode the number 64 (if only the upper or lower half 64 bytes are needed from a given L2 memory cache line) or 128 (if an entire L2 memory cache line is needed). In another example, the byte count may be a single bit signal where one state (e.g., 1) implicitly encodes an entire L2 memory cache line and another state (e.g., 0) implicitly encodes half of an L2 memory cache line.

The UMC 150 also includes a TAGRAM 152. The PA 142 received by the UMC 150 from the PMC 120 is used to perform a look-up into the TAGRAM 152 to determine whether the target PA is a hit or a miss in the L2 memory cache 155. If there is a hit in the L2 memory cache 155, the target information, which may be one-half of the cache line or the entire cache line depending on the byte count 140, the target information is returned to the CPU core 102 with a copy being stored in the L1P 130 from which the same program instructions will be provided to the CPU core 102 the next time that the CPU core 102 attempts to fetch the same program instructions.

In example of FIG. 1, the CPU core 102 provides a VA 103 and a prefetch count 104 to the PMC 120. The PMC 120 initiates the workflow to retrieve the prefetch packet from the L1P 130 or L2 memory cache 155 as describe above. Using the prefetch count 104 and the original VA 103, the PMC 120 calculates additional virtual addresses and proceeds to retrieve prefetch packets corresponding to those calculated VAs from the L1P 130 or L2 memory cache 155. For example, if the prefetch count is 2 and the VA 103 from the CPU core 102 is 200*h*, the PMC 120 calculates the next two VAs as 240*h* and 280*h*, rather than the CPU core 102 providing each such VA to the PMC 120.

Figure 2:
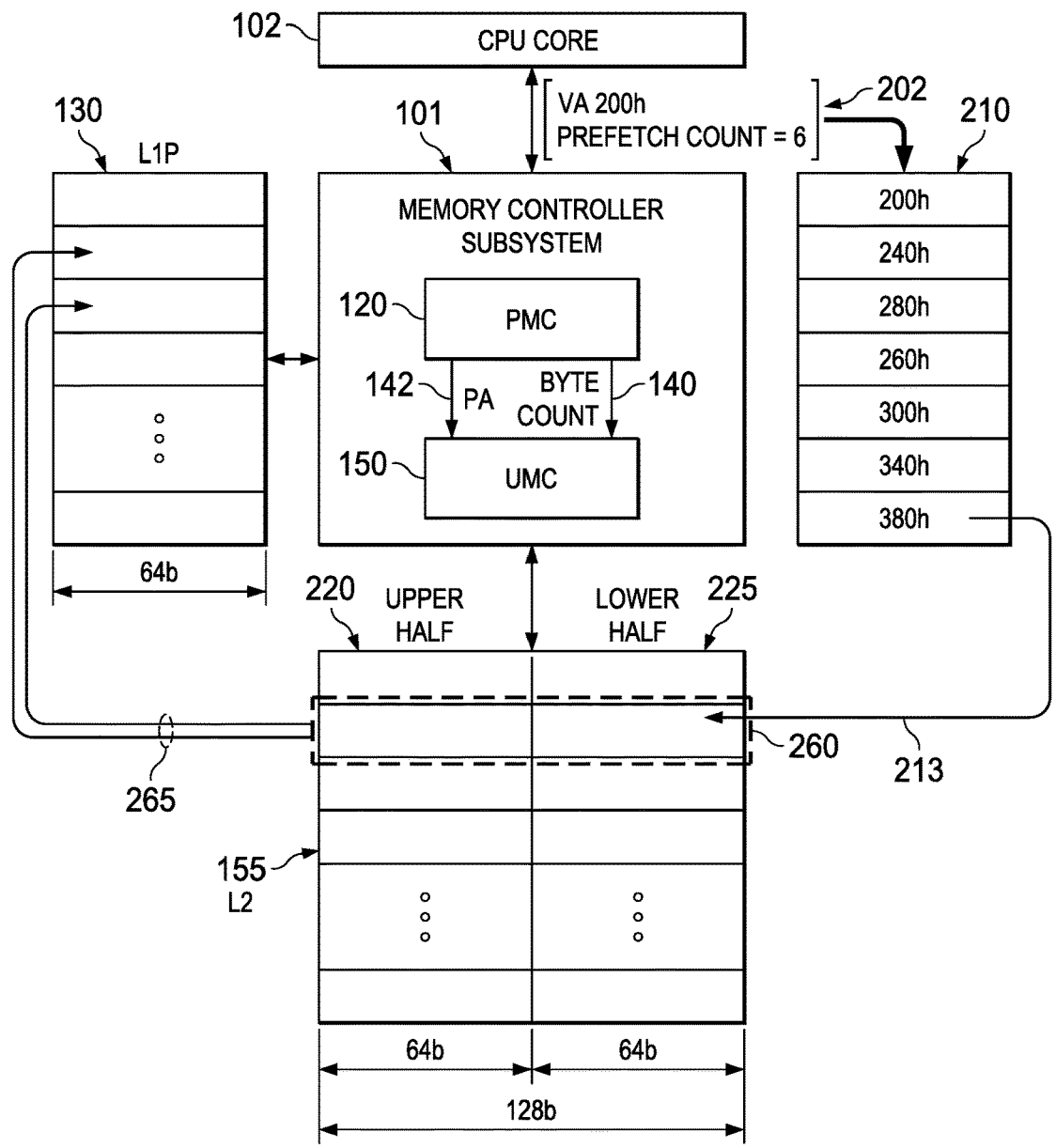
FIG. 2 illustrates the promotion of an L1 memory cache access to a full L2 cache line access in accordance with an example.

FIG. 2 illustrates a specific example in which an optimization results in improved performance of the processor 100. As noted above, the line width of L2 memory cache 155 is larger than the line width of L1P. In one example, the width of L1P is 64 bytes and the line width of L2 memory cache 155 is 128 bytes as shown in FIG. 2. The L2 memory cache 155 is organized as an upper half 220 and a lower half 225. The UMC 150 can read an entire 128 byte cache line from the L2 memory cache 155, or only half (upper half 220 or lower half 225) of an L2 memory cache line.

A given VA may translate into a particular PA that, if present in the L2 memory cache 155, maps to the lower half 225 of a given line of the L2 memory cache or maps to the upper half 220. Based on the addressing scheme used to represent VAs and PAs, the PMC 120 can determine whether a given VA would map to the lower half 225 or upper half 220. For example, a particular bit within the VA (e.g., bit 6) can be used to determine whether the corresponding PA would map to the upper or lower halves of the line of the L2 memory cache. For example, bit 6 being a 0 may indicate the lower half and bit 6 being a 1 may indicate the upper half.

Reference numeral 202 shows an example of a VA of 200*h* provided by the CPU core 102 to the PMC 120 and a corresponding prefetch count of 6. Reference numeral 210 illustrates that the list of VAs that are run through the cache pipeline described above include 200*h* (received from the CPU core 102) and the next 6 consecutive virtual address 240*h*, 280*h*, 2*c*0*h*, 300*h*, 340*h*, and 380*h* (calculated by the PMC 120).

Each address from 200*h* through 380*h* is processed as described above. Any or all of the VAs may be a miss in the L1P 130. The PMC 120 can package two consecutive VAs that miss in the L1P 130 into a single L2 cache line access attempt. That is, if 200*h* and 240*h* both miss in the L1P 130, and the physical address corresponding to 200*h* corresponds to the lower half 225 of a particular cache line of the L2 memory cache 155 and the physical address corresponding to 240*h* corresponds to the upper half 225 of the same cache line of the L2 memory cache, the PMC 120 can issue a single PA 142 to the UMC 150 along with a byte count 140 specifying an entire cache line from the L2 memory cache. That is, two contiguous VA misses in L1P 130 can be promoted into a single full line L2 memory cache look-up.

If the last VA in a series of VAs initiated by the CPU core 102 (e.g., VA 380h in VA series 210) maps to the lower half 225 of a cache line of the L2 memory cache 155, then in accordance with the described examples, the entire cache line of the L2 memory cache 155 is retrieved even though only the lower half 225 was needed. The same response occurs if the CPU provided a VA 103 to the PMC 120 with prefetch count of 0 meaning that the CPU 102 only wanted a single prefetch unit. Very little if any additional overhead, time, or power consumption is expended to retrieve the entire cache line and provide the entire cache line to the L1P 130. Since program instructions are often executed in linear order, the probability is generally high that the program instructions in the upper half 220 would be executed following the execution of the instructions in the lower half 225 anyway. Thus, the next set of instructions are received at very little cost and such instructions are likely to be needed anyway.

FIG. 2 illustrates through arrow 213 that VA 380h maps to the lower half 225 of cache line 260 in the L2 memory cache 155. The PMC 120 determines this mapping through an examination, for example, of one or more of the bits of the VA or its counterpart physical address following translation by the address translator 122. The PMC 120 promotes the look-up process by the UMC 150 to a full cache line read by submitting the PA associated with VA 380h along with a byte count 104 that specifies the entire cache line. The entire 128 byte cache line (if present in the L2 memory cache 155) is then retrieved and written to the L1P 130 in two separate 64 byte cache lines as indicated at 265.

If, however, the last VA in the series of VAs (or if there is only one VA for a prefetch count of 0) maps to the upper half 220 of a cache line of the L2 memory cache 155, then the PMC 120 requests the UMC 150 to look-up in its TAGRAM 152 and return to the CPU core 102 and the L1P 130 only the upper half of the cache line. The next PA would be in the lower half 225 of the next cache line of the L2 memory cache 155 and additional time, overhead and power would be consumed to speculatively retrieve the next cache line, and it is not certain that the CPU core 102 would need to execute those instructions.

Figure 3:
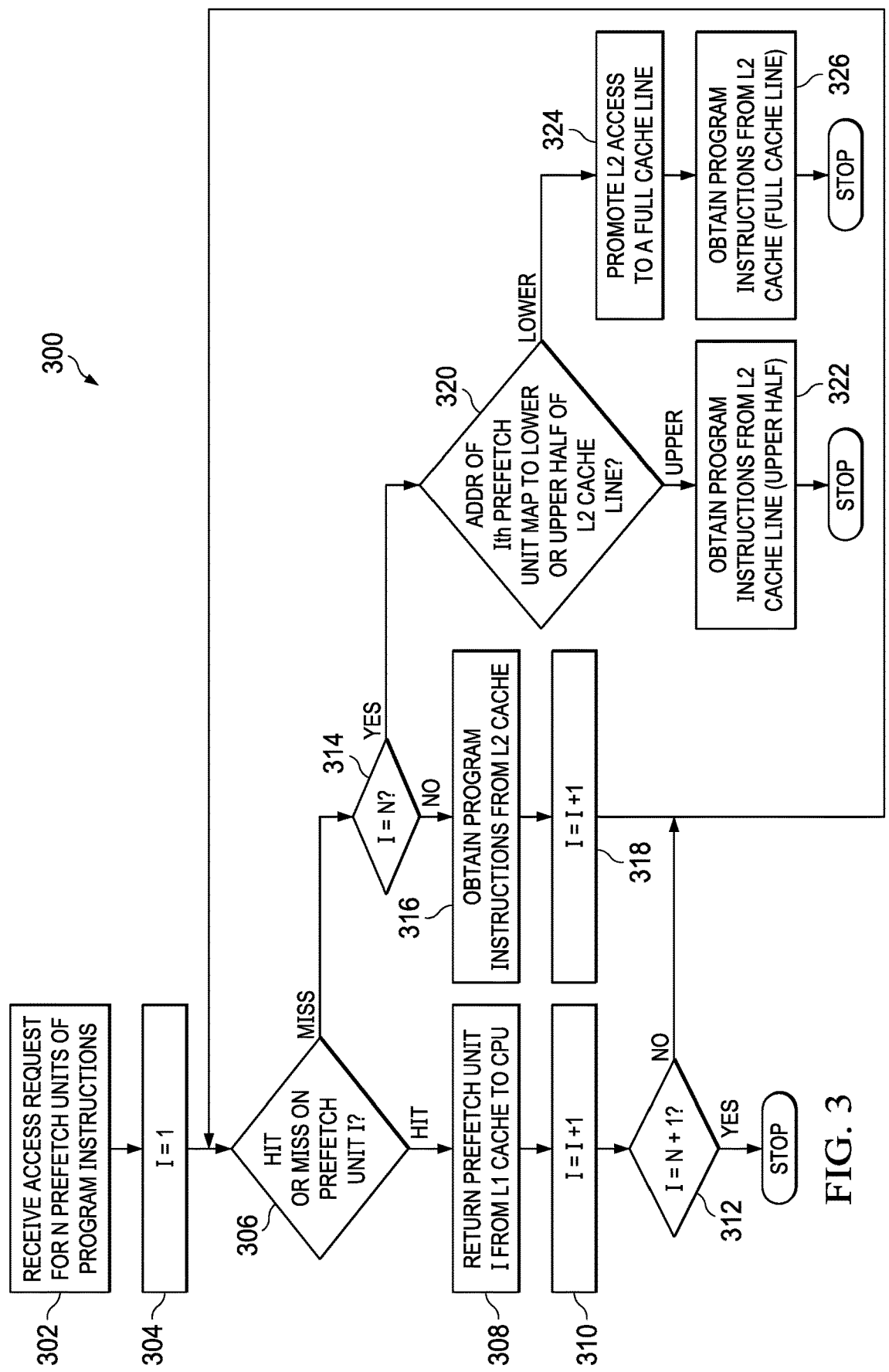
FIG. 3 is a flow chart to illustrate a performance improvement in accordance with an example.

FIG. 3 shows an example of a flow chart 300 for the above-described method. The operations can be performed in the order shown, or in a different order. Further, the operations can be performed sequentially or two or more of the operations can be performed concurrently.

At 302, the method includes receiving by the memory controller subsystem 101 an access request for N prefetch units of program instructions. In one implementation, this operation is performed by the CPU core 102 providing an address and count value to the PMC 120. The address may be a virtual address or a physical address, and the count value may indicate the number of additional prefetch units that are needed by the CPU core 102.

At 304, an index value I is initialized to a value 1. This index value is used to determine when the last virtual address in a series of consecutive virtual addresses is to be processed by the PMC 120. At 306, the method determines whether prefetch unit I is a hit or a miss into the L1P 130. This determination is made in some examples by determining if the virtual address is present in the PMC's TAGRAM 121. Two results are possible from the determination 306—a hit or a miss.

If the virtual address is a hit into the L1P 130, then at 308, the corresponding line of the L1P 130 which contains the desired prefetch unit is returned from the L1P 130 and provided back to the CPU core 102 as a prefetch packet 105. The index is then incremented at 310 (I=I+1). If I has not yet reached N+1 (as determined at decision operation 312), then the VA of the last of the prefetch units has not yet been evaluated for the hit/miss determination, and control loops back to 306 to evaluate the next Ith prefetch unit for a hit or miss in the L1P 130. If I has reached N+1, then all N prefetch units have been evaluated and the corresponding program instructions have been supplied to the CPU core 102 and the process stops.

For a given Ith prefetch unit, if PMC 120 determines there to be a miss in the L1P 130 at 306, then a determination is made at 314 as to whether I has reached the value of N. If I does not equal N (indicating that the last VA in a series of VAs has not been reached), then at 316, the method includes the memory controller subsystem 101 obtaining program instructions from the L2 memory cache 155 (if present there, or from a third level cache or system memory if not present). The index value I is then incremented at 318 and control loops back to determination 306.

If, at 314, I has reached N (indicating that the last VA in the series of VAs has been reached), then at 320 the method includes determining whether the VA of the Ith prefetch unit maps to the lower half or the upper half of the cache line of the L2 memory cache 155. An example of how this determination can be made is described above. If the VA of the Ith prefetch unit maps to the upper half, then at 322 the method includes obtaining the program instructions from only the upper half of the cache line of the L2 memory cache.

However, if the VA of Ith prefetch unit maps to the lower half, then at 324 the method includes promoting the L2 memory cache access to a full cache line access and, at 326, obtaining the program instructions from the full cache line of the L2 memory cache.

Referring back to FIG. 1, as described above, following submission from the CPU core 102 to the PMC 120 of a VA 103, the CPU core 102 also can provide a prefetch count 104 to the PMC 120. The prefetch count could be 0 meaning that the CPU core 102 does not need any more instructions other than those contained in the prefetch unit starting at the VA 103. However, in between receipt of the VA 103 and the subsequent prefetch count, the PMC 120 has done some work as described below.

Upon receipt of the VA 103, the PMC 120 performs a look-up in TAGRAM 121 to determine whether the first VA (provided by the CPU core 102) is a hit or miss in L1P and also performs a VA to PA conversion using the address translator 122. The PMC 120 also calculates a second VA (the next contiguous VA following the VA provided by the CPU core) before receiving the prefetch count 104. The PMC 120 speculatively accesses the TAGRAM 121 and uses the address translator 122 to determine the hit/miss status of the second VA, and populates register 123 with the hit/miss indication 124 and the PA 125. The valid bit 126 in the register 123 is set to a valid state to thereby permit further processing of the second VA as described above (e.g., retrieve the corresponding cache line from the L1P 130 if present, or from the L2 memory cache 155 if needed).

However, before any further processing of the second VA occurs, it is possible that the CPU core 102 sends a prefetch count of 0 to the PMC 120 meaning that the CPU core does not need any prefetch units besides the prefetch unit starting at the original VA 103. At this point, the PMC 120 is provided a prefetch count of 0, and thus the prefetch unit associated with the second VA is not needed. However, the PMC also already determined the hit/miss status of the second VA and has generated the corresponding PA. Both the hit/miss indicator 124 and the PA 125 have been stored in the register 123 by the time the zero prefetch count has been received by the PMC 120. The PMC 120 changes the status of the valid bit 126 to indicate an invalid state to thereby preclude any further processing of the second VA. This condition (valid bit set to an invalid state) is referred to as a "kill", that is, the PMC 120 kills the processing of the second VA.

In some situations, however, the CPU core 102 may determine, despite the previous kill, that the prefetch unit associated with the second VA should indeed be obtained from the L1P 130 or L2 memory cache 155 as described above. For example, if the CPU core 102 has no further internal prediction information to inform the next required instruction address, the CPU core 102 will signal to the PMC 120 that it should continue prefetching linearly starting from the last requested address. This condition may occur, for example, due to a misprediction in the branch prediction logic in the CPU core 102. The CPU core 102 thus issues a revive signal 106 to the PMC 120 for this purpose. The PMC 120 responds to the revive signal by changing the valid bit 126 back to the valid state to thereby permit the continued processing of the second VA through the memory subsystem pipeline as described above. As such, the CPU 102 need not submit the second VA directly to the PMC 120. Instead, the PMC 120 retains the second VA in, for example, register 123 as well as its hit/miss indicator 124 thereby avoiding the power consumption and time spent to again determine the hit/miss status of the second VA and translate the second VA to a PA.

Figure 4:
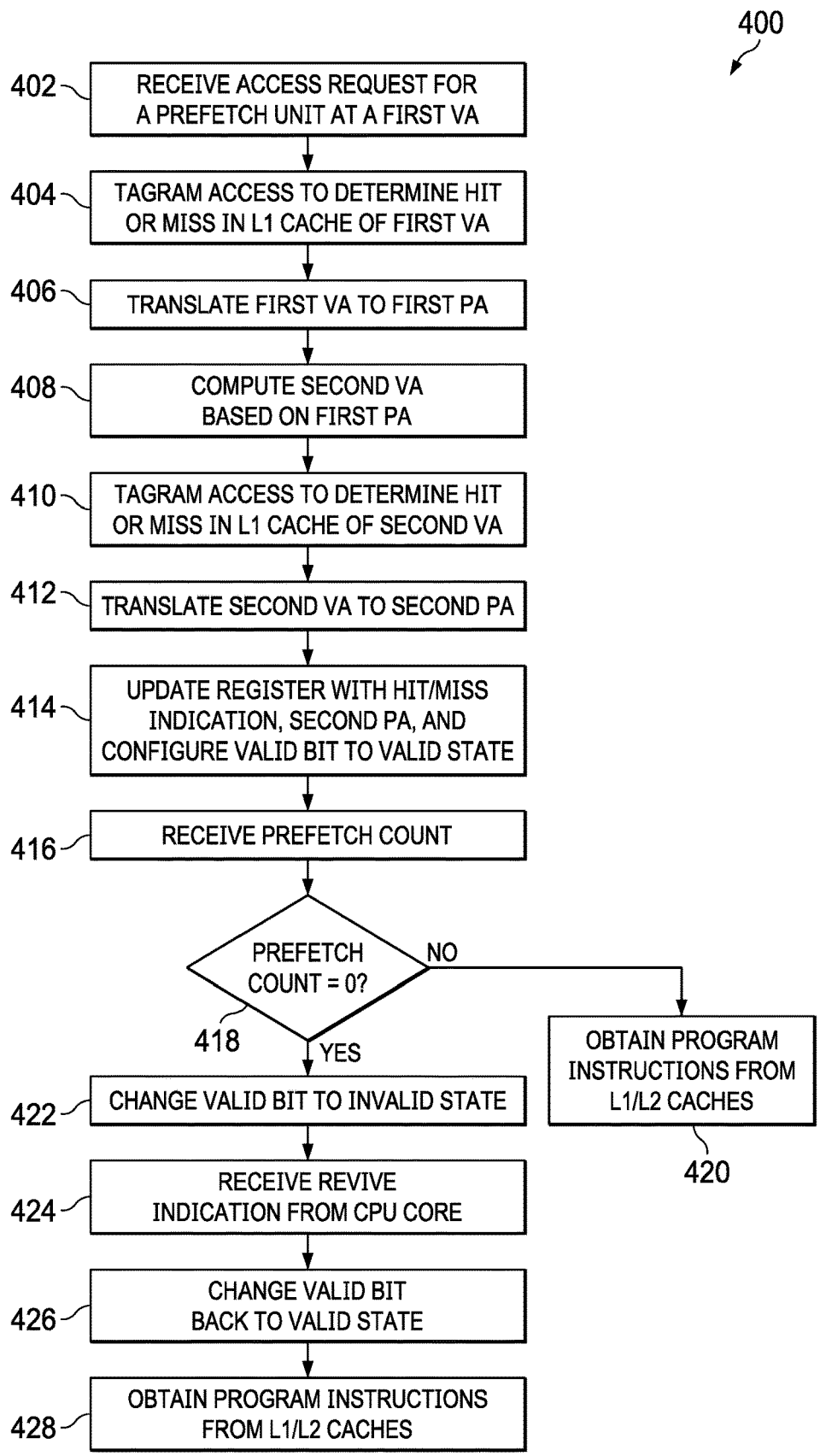
FIG. 4 is another flow chart to illustrate another performance improvement in accordance with an example.

FIG. 4 shows an example of a flow chart 400 for initiating, then killing, and then reviving a memory address look-up. The operations can be performed in the order shown, or in a different order. Further, the operations can be performed sequentially or two or more of the operations can be performed concurrently.

At 402, the method includes receiving by the memory controller subsystem 101 an access request at a first VA. In one implementation, this operation is performed by the CPU core 102 providing the first VA to the PMC 120. At 404, the method includes determining if the first VA is a hit or a miss in the L1P 30. In one example, this operation is performed by accessing the PMC's TAGRAM 121 to determine the hit/miss condition of the first VA. The first VA is translated to a first PA at 406 by using, for example, the address translator 122.

At 408, the method includes computing a second VA based on the first VA. The second VA may be computed by incrementing the first VA by a value to generate an address of a byte that is 64 bytes following the byte associated with the first VA. At 410, the method includes determining if the second VA is a hit or a miss in the L1P 30. In one example, this operation is performed by accessing the PMC's TAGRAM 121 to determine the hit/miss condition of the second VA. The second VA is translated to a second PA at 412 by using the address translator 122 as described above. At 414, the method includes updating a register (e.g., register 123) with the hit/miss indicator 124 and the second PA. Further, the valid bit 126 is configured to be a valid state.

The PMC 120 then receives a prefetch count at 416. Then, at 418, if the prefetch count is greater than zero, then at 420, the program instructions from the L1P 130 or the L2 memory cache 155 (or additional level(s)) are retrieved as described above. However, if the prefetch count is zero, then at 422, the valid bit 126 is changed to the invalid state. Despite having provided a prefetch count of zero to the PMC 120, the CPU core 102 may then provide a revival indication to the PMC 120 (424). At 426, the PMC 120 changes the valid bit 126 back to the valid state and memory controller subsystem 101 then obtains the program instructions associated with the second PA from the L1P, L2 memory caches, etc. as appropriate (428).

Figure 5:
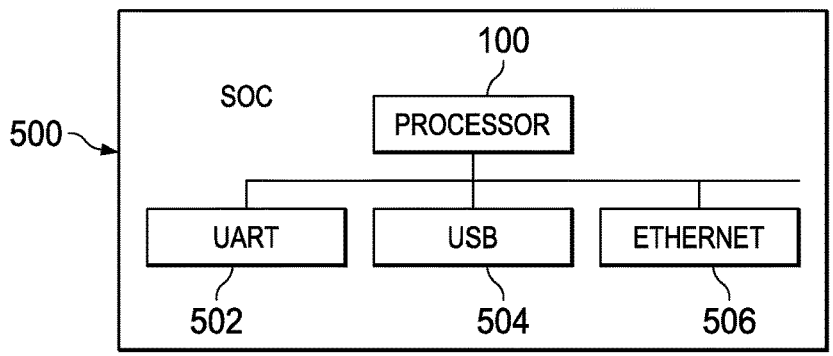
FIG. 5 shows a system that includes the processor of FIG. 1.

FIG. 5 shows an example use of the processor 100 described herein. In this example, the processor 100 is part of a system-on-chip (SoC) 500 that includes the processor 100 and one or more peripheral ports or devices. In this example, the peripherals include a universal asynchronous receiver transmitter (UART) 502, a universal serial bus (USB) port 504, and an Ethernet controller 506. The SoC 500 can perform any of a variety of functions as implemented by, for example, the program instructions executed by the processor 100. More than one processor 100 may be provided and, within a given processor 100, more than one CPU core 102 may be included.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A device comprising:
   a first memory cache that includes a first set of memory lines;
   a second memory cache that includes a second set of memory lines, wherein each line of the second set of memory lines includes a first portion having a size equal to a line size of the first set of memory lines and a second portion having a size equal to the line size of the first set of memory lines; and
   a memory controller coupled to the first memory cache and the second memory cache, wherein the memory controller is configured to:
      receive an access request for a set of data units directed to the first memory cache; and
      for a first data unit of the set of data units:
         determine whether the first data unit misses in the first memory cache; and
         based on the first data unit missing in the first memory cache:
            determine that the first data unit is associated with the first portion of a first line of the second set of memory lines of the second memory cache; and
            determine, based on an order of the first data unit in the set of data units, whether to request data stored in the second portion of the first line of the second set of memory lines of the second memory cache.

2. The device of claim 1, wherein the memory controller is further configured to:
   request the data stored in the first portion of the first line from the second memory cache based on the first data unit missing in the first memory cache and being associated with the first portion and; and request the data stored in the second portion of the first line from the second memory cache based on the first unit of data being associated with the first portion and the order of the first data unit in the set of data units.

3. The device of claim 1, wherein:
the first portion of each line of the second set of memory lines corresponds to a lower half of the respective line;
the second portion of each line of the second set of memory lines corresponds to an upper half of the respective line; and
the memory controller is configured to perform the determining of whether to request the data stored in the second portion of the first line based on the first data unit being associated with the lower half of the first line.

4. The device of claim 1, wherein the determining, by the memory controller, of whether to request the data stored in the second portion of the first line based on the order of the first data unit in the set of data units is such that the memory controller requests the data stored in the second portion of the first line when the first data unit is last in the set of data units.

5. The device of claim 1, wherein the determining, by the memory controller, that the first data unit is associated with the first portion of the first line of the second set of memory lines of the second memory cache includes translating a virtual address associated with the first data unit to a physical address associated with the second memory cache.

6. The device of claim 5, wherein the memory controller is configured to request the first data unit by providing a request to the second memory cache that includes the physical address and a byte count that indicates whether to retrieve data stored in the second portion of the first line.

7. The device of claim 1, wherein the access request specifies a starting address and a number of data units in the set of data units.

8. The device of claim 1, wherein each data unit in the set of data units corresponds to a program instruction.

9. The device of claim 1, wherein the access request is a prefetch request.

10. The device of claim 1, wherein the first memory cache is a level 1 (L1) program cache and the second memory cache is a level 2 (L2) cache.

11. The device of claim 1 further comprising a processor coupled to the memory controller and configured to provide the access request and receive the set of data units.

12. A device comprising:
a processor configured to provide a memory access request directed to a set of data units;
a first memory cache that includes a first set of memory lines;
a second memory cache that includes a second set of memory lines, wherein each line of the second set of memory lines includes a first portion and a second portion;
a memory controller coupled to the processor, the first memory cache, and the second memory cache, wherein the memory controller is configured to:
receive the memory access request; and
for a first data unit of the set of data units:
determine whether the first data unit misses in the first memory cache; and
when the first data unit misses in the first memory cache:
determine whether the first data unit is associated with the first portion of a first line of the second set of memory lines of the second memory cache or the second portion of the first line;
when the first data unit is associated with the second portion of the first line, request data stored in the second portion of the first line without requesting data stored in the first portion of the first line; and
when the first data unit is associated with the first portion of the first line:
request the data stored in the first portion of the first line; and
determine whether to request the data stored in the second portion of the first line based on an order of the first data unit within the set of data units.

13. The device of claim 12, wherein the memory controller is further configured to, when the first data unit is associated with the first portion of the first line and when it is determined to request the data stored in the second portion of the first line based on the order of the first data unit within the set of data units, provide a request for an entirety of data stored in the first line.

14. The device of claim 13, wherein the request specifies a base address and whether to retrieve the entirety of the data stored in the first line.

15. The device of claim 12, wherein:
the first portion of each line of the second set of memory lines corresponds to a lower half of the respective line; and
the second portion of each line of the second set of memory lines corresponds to an upper half of the respective line.

16. The device of claim 12, wherein the memory controller is configured to request the data stored in the second portion of the first line when the first data unit is associated with the first portion of the first line and when the first data unit is last in the set of data units.

17. The device of claim 12, wherein the memory access request specifies a starting address and a number of data units in the set of data units.

18. The device of claim 12, wherein each data unit in the set of data units corresponds to a program instruction executable by the processor.

19. The device of claim 12, wherein the memory access request is a prefetch request.

20. The device of claim 12, wherein the first memory cache is a level 1 (L1) program cache and the second memory cache is a level 2 (L2) cache.

* * * * *